3,255,515
METHOD OF MAKING BLADED ROTORS
Daniel J. Clarke, Bay City, Mich., assignor to The Stalker Corporation, Essexville, Mich., a corporation of Michigan
Original application Sept. 8, 1961, Ser. No. 136,877, now Patent No. 3,173,655, dated Mar. 16, 1965. Divided and this application Jan. 25, 1965 Ser. No. 433,246
2 Claims. (Cl. 29—156.8)

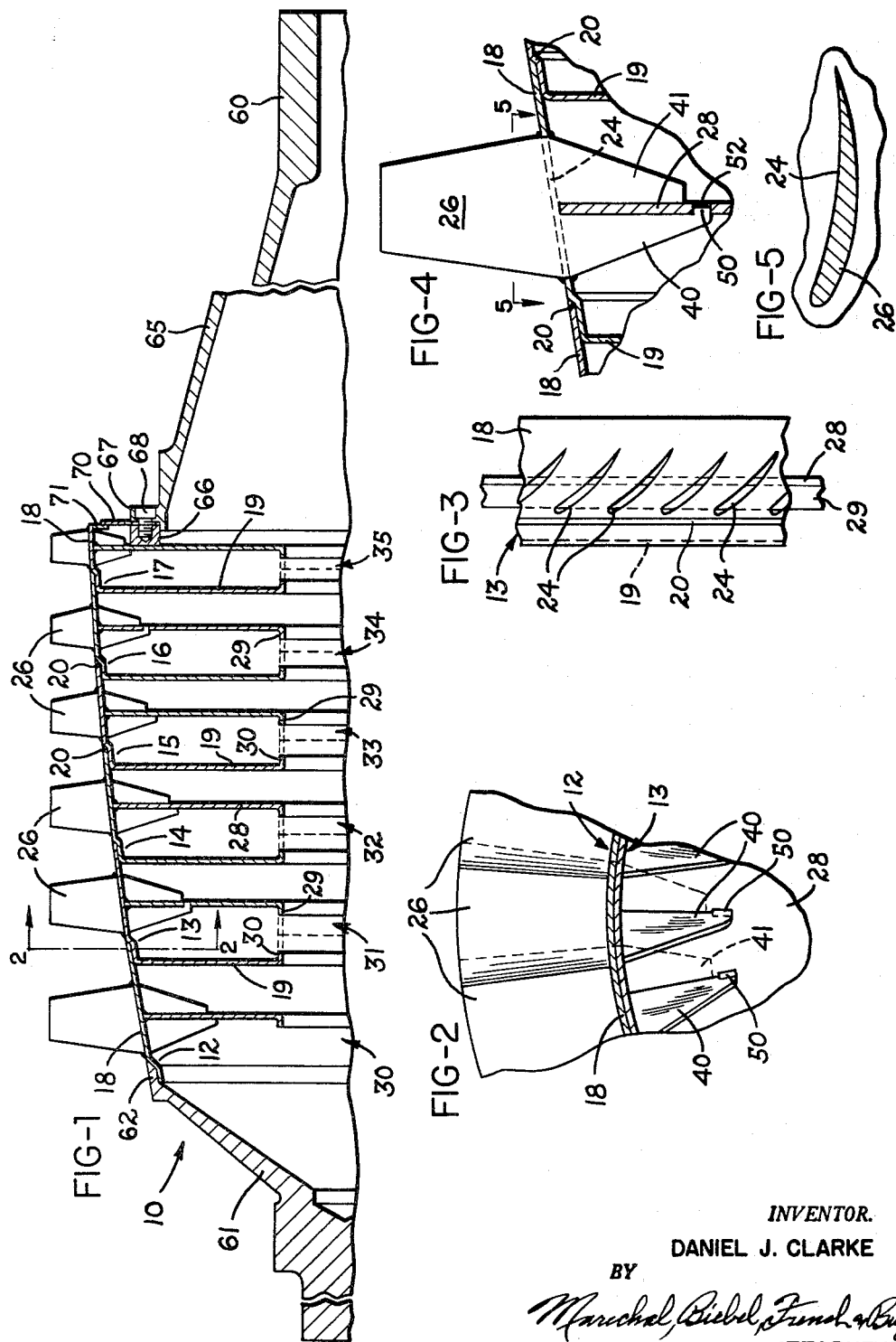

This application is a division of copending application Serial No. 136,877, filed September 8, 1961, now Patent No. 3,173,655, issued March 16, 1965, and the invention relates to bladed rotors for use in compressors, turbines and the like, and to a method of making the same.

The customary designs and procedures for making a multi-stage bladed rotor includes difficult problems concerning the locating and the assembling of the parts. Where a unitary or integral drum is employed with the blades extending therethrough, there arises a difficult problem of holding the various parts in their proper relation during the brazing operation in a furnace. This requires elaborate fixturing and further may result in the necessity of scrapping the whole multi-stage rotor if some of the blades or parts fail to be brazed.

The apparatus and method of this invention eliminates these difficulties by the provision of a plurality of annularly formed cups each of which form individual internesting stages which make up a complete rotor. Each stage of this rotor includes self-aligning and self-supporting components and eliminates the need for elaborate fixturing. Each stage may be individually brazed by fused metal and individually inspected to assure the proper bonding of the parts.

The cups are formed of sheet metal and each has an outer peripheral portion with a joggle formed therein providing for the interfitting or nesting of the stage including the cup with adjacent stages. The stages may then be assembled and fused together as a unit in a furnace. The resulting multi-stage motor of this invention is characterized by a low polar moment of inertia, light weight, and economy of fabrication. The light weight and low polar moment of inertia are in part achieved by the sheet metal fabrication which provides for thinner walls than can be machined economically.

An important object of this invention is the provision of a lightweight rotor as outlined above with a relatively small polar moment of inertia, and a method of making the same.

Another object of this invention is to provide a composite rotor the parts of which are self-positioning and self-supporting for a furnace welding operation.

A further object of this invention is to provide a multi-stage sheet metal rotor consisting of a plurality of inter-nesting parts each of which parts constitute an individual stage of the rotor.

Other objects and advantages of the invention will be apparent from the folowing description, the accompanying drawings and the appended claims.

In the drawings:
FIG. 1 is a fragmentary axial section through a multi-stage rotor constructed according to this invention;
FIG. 2 is a fragmentary vertical section taken generally along the line 2—2 of FIG. 1;
FIG. 3 is a fragmentary elevational view of one of the stages of the rotor of FIG. 1 showing the blade holes or slots with the blades removed;
FIG. 4 is an enlarged fragmentary detail of a portion of FIG. 1 showing the attachment of one of the blades and the internesting of the cups; and
FIG. 5 is a section through one of the blades taken generally along the line 5—5 of FIG. 4

Referring to the drawings, which illustrate a preferred embodiment of the invention, a rotor 10 comprises a plurality of sheet metal cups 12–17. Each of the cups is formed with a generally axially, rearwardly extending rim portion 18, and an integral generally radially extending wall 19. Each cup 12–17 has a joggle such as indicated at 20 preferably formed at the forward or smaller diameter of the rim portion 18 so that one cup can be received in part telescopically on or within the rim of an adjacent cup.

Each cup has peripherally spaced blade openings or slots 24 formed in its rim. For instance, the cup 13 in FIG. 3 has a plurality of peripherally spaced blade slots 24 formed therein conforming to the blade sections, in shape. Each blade 26 extends radially inwardly through a slot 24 for support by a sheet metal blade supporting disk 28, as shown in enlarged detail in FIG. 4. The blades 26 conform closely to the adjacent surfaces of the slots 24 to provide proper brazing clearance when the blades are furnace welded in place.

The disks 28 are formed with forwardly extending annular flanges 29 which cooperate with rearwardly extending annular flanges 30 formed as a part of the walls of the cups. The adjacent edges of the flanges 29 and 30 are in contiguous relation in the assembled condition of the cup and disk.

The multi-stage rotor 10 comprises the sub-assemblies 30–35. Each sub-assembly comprises a stage of blades 26, a blade supporting disk 28 and a cup. For instance, the sub-assembly 31 comprises the cup 13, the blade supporting disk 28, and the blades 26 which extend radially through the slots 24 in the rim portion 18 of the cup to straddle the support disk to which they are jointed by fused metal, preferably by high temperature solder commonly known as brazing material.

The means for securing the blades in fixed assembled condition within the individual sub-assemblies 30–35 include legs 40 and 41 of the blade which straddle the disk 28. The blades are preferably located at their inner ends by a small prong 50 formed on the leg 40 and seated in a hole 52 forming a sort of detent. The projection of the prong 50 into the hole 52 is small enough so that the legs 40 and 41 of the blade 26 can be sprung into place with the prong 50 entering the hole 52. In FIG. 2, it may be seen that the disk 28 is formed with a plurality of angularly spaced openings 52 within which the blades 26 of the sub-assembly are assembled and held.

Each of the sub-assemblies 30–35 for a rotor 10 is assembled and brazed separately. This makes possible the complete examination and inspection of each sub-assembly independently of the others. If one sub-assembly proves faulty it can be discarded. If the rotor structure were made of an integral drum extending across all the stages, a defective part or joint could cause the scrapping of the whole rotor. With the individual sub-assemblies the possible scrapping is limited to the defective sub-assembly only.

Another feature of the invention is the relative axial location of the parts without resorting to expensive jigging. To this purpose, the flanges 29 and 30 are extended to bear on one another. After the sub-assembly is brazed the flanges are cut away as indicated by the dotted portions shown in FIG. 1.

The sub-assemblies are positioned axially one on the other by the joggles 20. They are then preferably tack welded in a few points to hold them in position while they are brazed together, preferably in a furnace.

The completed sheet metal rotor drum is made by an indirect process rather than by the conventional process wherein the drum would be drawn or spun in toto from sheet, and the blades and other parts assembled to it. In the indirect method of this invention the drum is assembled from separate cups brazed together. At first examination this appears to be more expensive and heavier, but further study shows that the advantages of self-location greatly outweigh any of the integral drum which would require elaborate fixturing to hold the parts in proper relation during the brazing operation in a furnace. In fact such fixturing would have to be reconditioned after each pass through the furnace. This would entail a prohibitive cost.

Furthermore, by using a cup construction one of the disks is integral with the cup (or drum) and requires no fixturing for location or brazing. This integral construction is the lightest in weight.

The assembled rotor 10 may then be suitably secured to a shaft, as indicated in FIG. 1 wherein the shaft 60 is formed with an annular front hub 61 have a lip portion 62 proportioned to engage the joggle of the cup 12. The forward wall 19 of the cup 12 may be removed by cutting or eliminated, as desired, for this purpose.

The back hub 65 of the shaft 60 may be secured to the rotor 10 by means of an annular ring 66 secured to the outer surface of the adjacent disk 28 immediately below the legs of the blades. The hub 65 may be flanged as indicated at 67 to receive a plurality of bolts 68 which extends into the ring 66. Also, an annular closure plate 70 may also be retained by the flanges 66 and the bolts therethrough to cooperate with a depending ring 71 carried on the assembly 35.

It is therefore seen that this invention provides a rotor drum structure which is made up of a plurality of sub-assemblies consisting of individual cups and disks for retaining the blades. The rotor structure, in itself, provides in large part of the self-positioning of the blades and other parts, which is important to achieve low cost particularly during the brazing operation. The assembled rotor is characterized by a low polar moment of inertia by the utilization of sheet metal which results in thinner walls than can be machined economically.

While the form of apparatus and the method herein described constitutes a preferred embodiment of the invention, it is to be understood that the invention is not limited to this precise form of apparatus and method, and that changes may be made therein without departing from the scope of the invention which is defined in the appended claims.

What is claimed is:

1. The process of forming a multi-stage bladed rotor comprising the steps of forming a plurality of individual sub-assemblies representing separate stages each including a blade-positioning annular cup formed with a joggle in the outer periphery thereof for axial internesting with adjacent cups to form a drum, fitting a blade supporting disk within each said cup and spacing said cup and disk from each other with integral flanges on their radially inner edges, attaching blades to said disk which blades radially extend outwardly from the outer periphery of said annular cup to form the sub-assembly, separately brazing each sub-assembly making up a rotor, cutting away a portion of said integral flanges to provide access for inspection between the cup and the disks, assembling a plurality of said sub-assemblies after individual inspection into said internesting relation to form a drum, and furnace brazing the assembled drum to form a complete multi-stage rotor.

2. The process of forming a multi-stage bladed rotor comprising the steps of forming a plurality of individual sub-assemblies representing separate stages by pressing sheet metal material to form blade-positioning sheet metal annular cups formed with a joggle in the outer periphery thereof for axially internesting with adjacent cups similarly formed to form a sheet metal drum, fitting a blade supporting disk within each said cup and spacing said cup and disk from each other with integral flanges on their radially inner edges, attaching blades to said disk, which blades radially extend outwardly from the outer periphery of said annular cup to form the sub-assembly, separately brazing each sub-assembly making up a rotor, cutting away a portion of said integral flanges to provide access for inspection between the cup and the disks, assembling a plurality of said sub-assemblies after individual inspection into said internesting relation to form a drum, and furnace brazing the assembled drum to form a complete multi-stage rotor.

References Cited by the Examiner

UNITED STATES PATENTS

| | | |
|---|---|---|
| 2,692,563 | 10/1954 | Kovacs. |
| 2,825,124 | 3/1958 | Nichols et al. _____ 29—156.8 |
| 2,850,229 | 9/1958 | Stalker. |
| 2,867,407 | 1/1959 | Stalker. |
| 2,892,583 | 6/1959 | Clarke _____ 29—156.8 X |
| 2,925,248 | 2/1960 | Stalker _____ 253—39 |
| 2,937,847 | 5/1960 | Stalker _____ 253—39 |

WHITMORE A. WILTZ, *Primary Examiner.*

J. C. HOLMAN, P. M. COHEN, *Assistant Examiners.*